United States Patent [19]
Voorhees et al.

[11] 3,797,327
[45] Mar. 19, 1974

[54] ARRANGEMENT FOR DYNAMIC BALANCING OF A HIGH SPEED PRESS

[75] Inventors: John E. Voorhees, Sidney; Donald J. Hemmelgarn, Minster, both of Ohio

[73] Assignee: The Minster Machine Company, Minster, Ohio

[22] Filed: Sept. 5, 1972

[21] Appl. No.: 286,122

[52] U.S. Cl............... 74/604, 72/429, 100/292
[51] Int. Cl............................... F16f 15/10
[58] Field of Search........... 74/604, 603; 123/192 B, 123/192 R; 100/292; 72/429

[56] References Cited
UNITED STATES PATENTS

| | | | |
|---|---|---|---|
| 2,808,736 | 10/1957 | Jackson | 74/604 |
| 2,117,700 | 5/1938 | Burkhardt | 123/192 B |
| 1,575,239 | 3/1926 | Walker | 74/603 |
| 3,402,707 | 9/1968 | Heron | 74/604 X |
| 3,415,237 | 12/1968 | Harkness | 74/604 X |
| 3,555,586 | 1/1971 | Wisebaker | 72/429 X |

*Primary Examiner*—Benjamin W. Wyche
*Assistant Examiner*—F. D. Shoemaker
*Attorney, Agent, or Firm*—Albert L. Jeffers; Roger M. Rickert

[57] ABSTRACT

A high speed mechanical press having two parallel counterrotating crankshafts with a reciprocating slide connected thereto and with off center masses fixed to the crankshafts in distributed relation therealong for counterbalancing the inertia forces developed on the crankshafts by the reciprocating components of the press and the centrifugal forces developed on the crankshaft by off center masses acting thereon at the throw portions of the crankshafts.

7 Claims, 4 Drawing Figures

ARRANGEMENT FOR DYNAMIC BALANCING OF A HIGH SPEED PRESS

This invention relates to an arrangement for dynamic balancing a high speed press, and is particularly concerned with the dynamic balancing of a high speed mechanical press having a pair of counterrotating crankshafts in the press crown connected to a reciprocating slide.

Mechanical presses, including presses with counterrotating crankshafts are known, but do not usually operate at such high speeds that serious forces of unbalance occur anywhere in the press structure. It is contemplated, however, to operate such presses up to speeds of 1600 strokes a minute, or more, and at these operating speeds, forces of unbalance can reach substantial proportions. For example, the slide of the press and the parts connected thereto reciprocate between a top dead center position and a bottom dead center position and develop substantial forces of unbalance due to inertia forces created by the movement of the reciprocating components.

Further, the slide is driven by a pair of rotating crankshafts, each of which has a throw portion and forces of unbalance can be created by eccentric mass disposed at the throw portion of each crankshaft or so connected to the throw portions of the crankshaft as to be considered rotating therewith.

A primary object of the present invention is the provision of an arrangement for counterbalancing the aforementioned inertia and centrifugal forces of unbalance that can be created in a press arrangement of the nature referred to and, particularly, in connection with high speed presses.

A further object is the provision of a system for calculating the size and disposition of counterbalancing masses to produce the best dynamic conditions in respect of a high speed press of the nature referred to.

These and other objects and advantages of the present invention will become more apparent upon reference to the following detailed specification taken in connection with the accompanying drawings in which.

BRIEF SUMMARY OF THE INVENTION

According to the present invention, a press is provided with a pair of crankshafts geared together to rotate in respectively opposite directions and each having a throw portion connected by a connecting rod with the upper end of a piston member, the lower end of which is fixed to a press slide.

For counterbalancing the inertia forces created by the reciprocating components of the press and the centrifugal forces created by unbalanced mass rotated with the crankshaft, counterbalancing mass elements are fixed to the crankshafts to rotate therewith. These elements are constructed and arranged to develop forces on the crankshaft substantially balancing the aforementioned inertia and centrifugal forces of unbalance acting on the crankshafts.

DETAILED DESCRIPTION OF THE INVENTION

Figure 1:
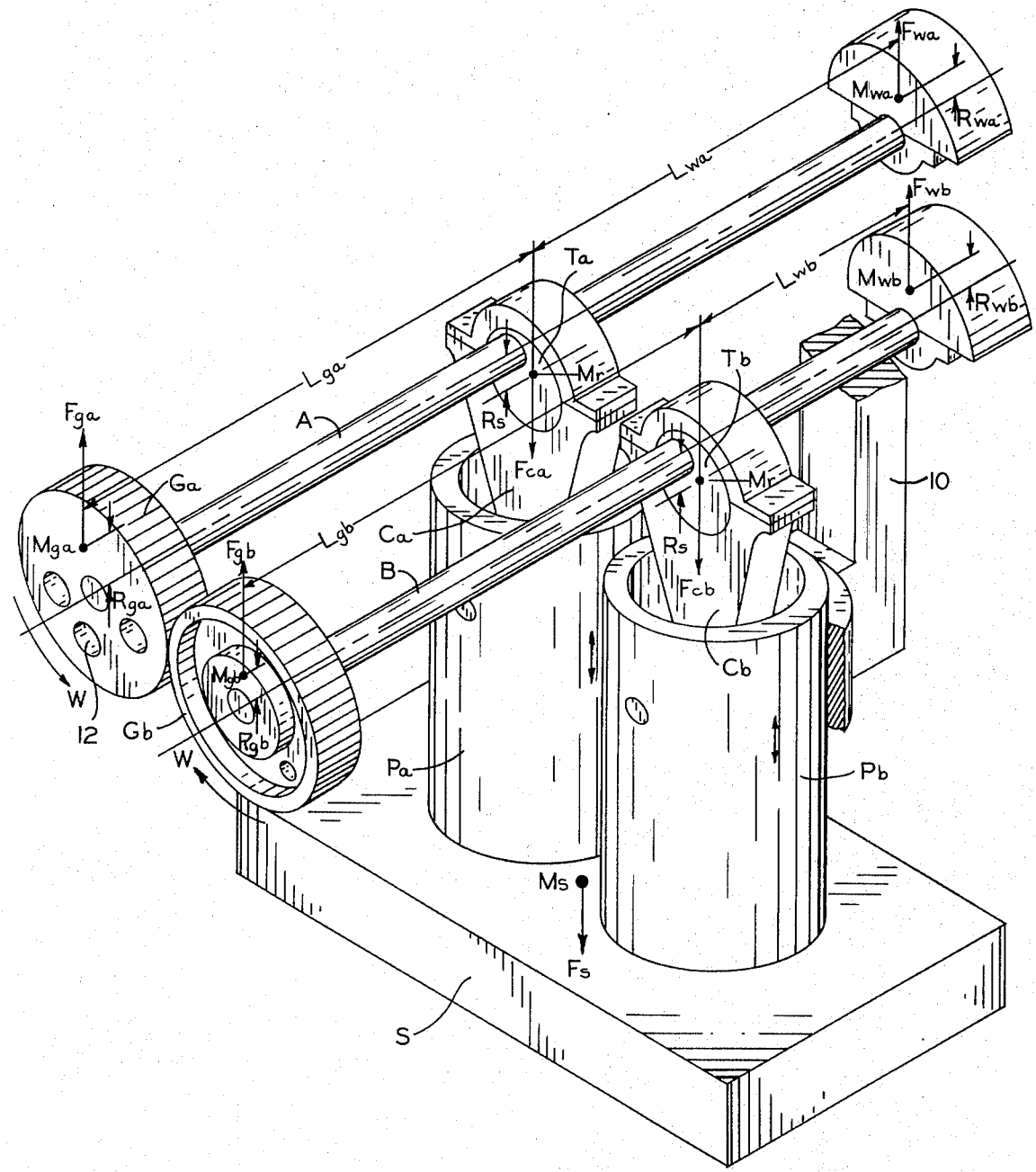
FIG. 1 is a somewhat schematic perspective view showing the basic arrangement of that part of a press structure that is counterbalanced according to the present invention.

Referring to the drawings somewhat more in detail, in FIG. 1, a first crankshaft is indicated at A and a second crankshaft at B. Crankshafts A and B are parallel and are geared to rotate together by the gears $Ga$ and $Gb$. Crankshaft A has a throw portion $Ta$ thereon and crankshaft B has a throw portion $Tb$ thereon. The crankshafts are identical in every respect, and the throw portions are so oriented on the respective crankshafts that both reach top and bottom dead center at the same instant.

Mounted on crankshaft A on one side of the throw portion thereof is a counterweight, the center of mass of which, indicated at $Mwa$, is directly opposite in the radial direction from the center of mass $Mr$ of the throw portion $Ta$. The radius of eccentricity of center of mass $Mwa$ is indicated by the radius $Rwa$ in FIG. 1, while the radius of eccentricity of the center of mass $Mr$ of throw portion $Ta$ is indicated by the radius $Rs$.

The axial distance of center of mass $Mwa$ from center of mass $Mr$ is indicated by the dimension $Lwa$.

On the opposite side of throw portion $Ta$ of shaft A, the gear $Ga$ is indicated as having a center of mass $Mga$ which has a radius of eccentricity $Rga$ which is parallel to the radius of eccentricity $Rwa$ previously referred to. The axial distance from the center of mass $Mga$ of gear $Ga$ to the center of mass $Mr$ of throw $Ta$ of crankshaft A is indicated by the dimension $Lga$.

The crankshafts are shown with the throws in the bottom of dead center position and in this position the off center mass at the throw portion of the crankshaft is developing a force $Fca$ directed vertically downwardly whereas the force developed by off center mass $Mga$ of gear $Ga$ is indicated at $Fga$ and acts vertically upwardly while the force directed by mass $Mwa$ of the counterweight is indicated by $Fwa$ and acts vertically upwardly.

The same off center masses and the dimensions pertaining thereto and the forces developed by the off center masses are indicated by the same reference characters on shaft B, except that the final letter of each indication is b instead of a.

The slide of the press is indicated at S and connected thereto are two pistons $Pa$ and $Pb$, the upper ends of which are pivotally connected to the lower ends of connecting rods $Ca$ and $Cb$ respectively, the upper ends of which are engaged by the respective crankshaft throws.

The crankshafts are rotatably supported in the press crown and the pistons are reciprocably guided in the press crown with the press crown being schematically indicated by reference numeral 10 in FIG. 1.

The reciprocating components of the arrangement, and which includes the slide S and the pistons $Pa$ and $Pb$ and substantial portions of the connecting rods $Ca$ and $Cb$, have a center of mass $Ms$ which develops an inertia force indicated at $Fs$ and which may be directed either upwardly or downwardly depending on the position of the slide in its stroke.

The off center mass for the gears $Ga$ can advantageously be arrived at by drilling holes 12 in the gears, but it is also possible to attach off center mass to the gears if preferred.

Figure 2:
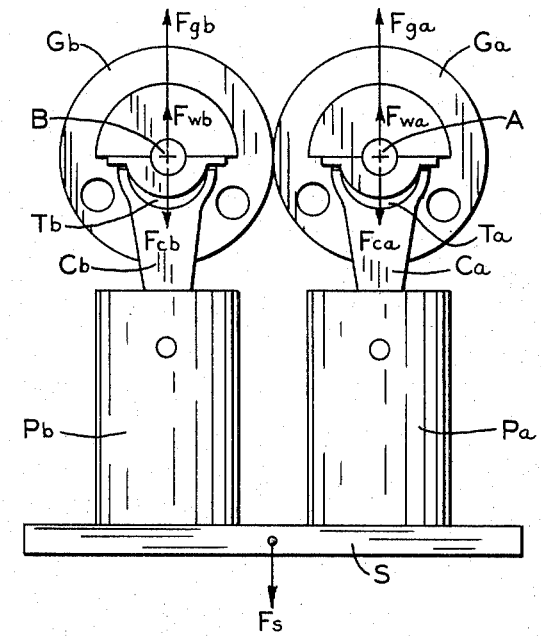
FIGS. 2, 3 and 4 show the rotating and reciprocating components of the press structure and the counterbalancing masses associated therewith in three different positions of operation.
Figure 3:
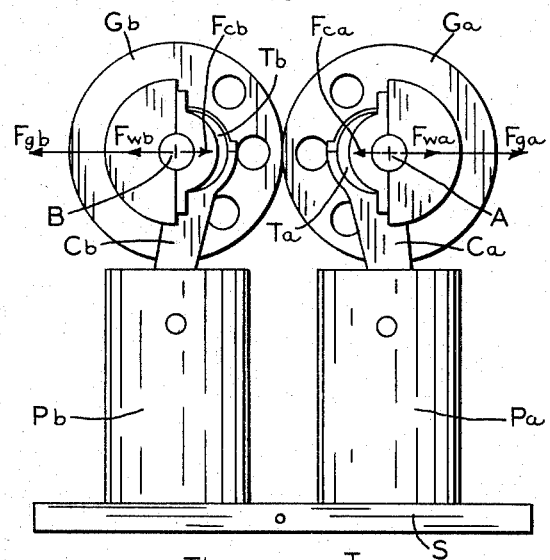
Figure 4:
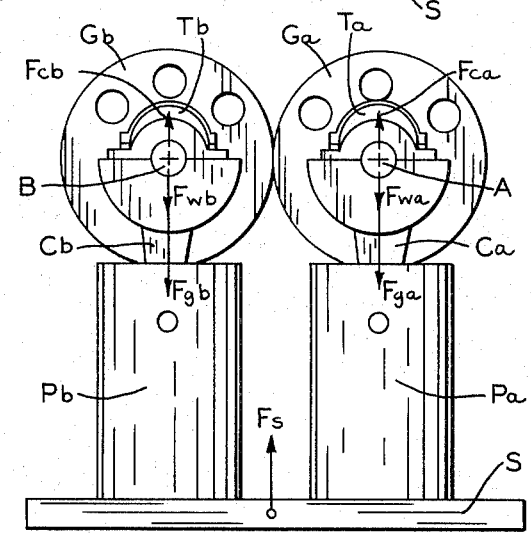

FIGS. 2, 3 and 4 show the slide S of the press at bottom dead center, mid stroke and top dead center, respectively, and illustrate also the directions of the inertia and centrifugal forces which are acting on the respective crankshafts.

For smooth, vibration free, operation of the press at high speeds, the forces of unbalance in the form of the primary inertia forces developed by the reciprocating components as well as the centrifugal forces developed by rotating unbalanced mass on the crankshafts are substantially balanced out by the arrangement described above.

In defining the balancing system, it is necessary to determine the total amount of the reciprocating mass, which has been referred to as $Ms$ and which includes the mass of the slide, the pistons and that portion of the masses of the connecting rods which reciprocate, together with the wrist pins that connect the connecting rods to the pistons and the weight of the die part that is attached to the slide. The die parts will vary somewhat in weight, but it has been found that for a given machine, the die parts will average about the same weight so that a fixed counterbalance system has been found to be quite satisfactory.

If necessary, the weight of the die part on the slide could be adjusted to a predetermined amount, if so desired, thereby to provide for substantially balancing the system.

In effecting the calculations leading to the determination of the counterbalancing necessary and the dispositions thereof with respect to the radii of eccentricity thereof and the axial disposition of the counterbalancing masses along the crankshaft, the following dimensions and values are employed:

$Ms$ — Total mass of reciprocating components.
$Rs$ — Crank throw eccentricity.
$Fs$ — Peak value of the primary component of the total reciprocating slide inertia force.
$Fc$ — Centrifugal unbalance force developed by the rotating mass of the crank throw portion and the portion of the mass of one connecting rod that may be considered to rotate with its crankshaft.
$S$ — Stroke of press slide.
$Mr$ — The mass of one crank throw portion together with the portion of one connecting rod that may be considered to rotate with the crankshaft.
$Mga$ — Mass of gear on Shaft A.
$Mgb$ — Mass of gear on Shaft B.
$Rga$ — Eccentricity of center of gravity of gear mass on Shaft A.
$Rgb$ — Eccentricity of center of gravity of gear mass on Shaft B.
$Fga$ — Centrifugal force developed by rotating gear on Shaft A.
$Fgb$ — Centrifugal force developed by rotating gear on Shaft B.
$Lga$ — Length along Shaft A from connecting rod centerline to center of gravity of gear.
$Lgb$ — Length along Shaft B from connecting rod centerline to center of gravity of gear.
$Mwa$ — Mass of balancing weight carried on Shaft A.
$Mwb$ — Mass of balancing weight carried on Shaft B.
$Rwa$ — Radius from shaft centerline to center of gravity of balancing weight carried on Shaft A.
$Rwb$ — Radius from shaft centerline to center of gravity of balancing weight carried on Shaft B.
$Fwa$ — Centrifugal force developed by rotating balancing weight carried on Shaft A.
$Fwb$ — Centrifugal force developed by rotating balancing weight carried on Shaft B.
$Lwa$ — Length along Shaft A from connecting rod centerline to center of gravity of balancing weight carried on Shaft A.
$Lwb$ — Length along Shaft B from connecting rod centerline to center of gravity of balancing weight carried on Shaft B.
$N$ — Angular velocity of Shafts A and B which are seen to be geared together to rotate in opposite directions at the same speeds.

The peak value of the primary inertia forces developed by the reciprocating slide assembly is given by:

$$Fs = Ms\ Rs\ N^2 \qquad (1)$$

This force varies sinusoidally with crankshaft rotation reaching its peak downward value at the time that the slide is at the bottom of its stroke and reaching its peak upward value at the time the slide is at the top of its stroke.

In addition to the reciprocating unbalance force the rotating unbalance force developed on each of the two crankshafts given by the following:

$$Fc = Mr\ Rs\ N^2 \qquad (2)$$

The balance correction forces are given by the following relationships:

$$Fga = Mga\ Rga\ N^2 \qquad (3)$$

$$Fwa = Mwa\ Rwa\ N^2 \qquad (4)$$

$$Fgb = Mgb\ Rgb\ N^2 \qquad (5)$$

$$Fwb = Mwb\ Rwb\ N^2 \qquad (6)$$

For the best balance correction the following relationships should apply:

$$Fga + Fwa = 0.5\ Fs + Fc \qquad (7)$$

$$Fga\ Lga = Fwa\ Lwa \qquad (8)$$

$$Fgb + Fwb = 0.5\ Fs + Fc \qquad (9)$$

$$Fgb\ Lgb = Fwb\ Lwb \qquad (10)$$

Substituting equations (1) thru (6) in equations (7) thru (10) and eliminating $N^2$ yields the following relationships for proper balancing:

$$Mga\ Rga + Mwa\ Rwa = Rs\ (0.5\ Ms + Mr) \quad (11)$$

$$Mga\ Rga\ Lga = Mwa\ Rwa\ Lwa \quad (12)$$

$$Mgb\ Rgb + Mwb\ Rwb = Rs\ (0.5\ Ms + Mr) \quad (13)$$

$$Mgb\ Rgb\ Lgb = Mwb\ Rwb\ Lwb \quad (14)$$

It is clear from the above relationships that the designer retains a great deal of latitude of choice in the placement of the balancing weights on the press crankshafts and in the magnitude of these weights. In the particular design illustrated the weights near one end of the crankshaft were made integral with the gears that couple the shafts together by boring holes through one side of these gears to displace the center of gravity of the gears away from the shaft centerline. An equivalent effect could have been produced by bolting or otherwise fastening weights to the gears, or by leaving the gears uniform and by adding weights at another location near the gear end of the shafts.

So long as the relationships expressed by equations (12) and (14) are maintained no tipping moment will be developed by the balancing weights on either crankshaft. So long as the relationships expressed by equations (11) and (13) are maintained the net balancing force will be correct on each crankshaft.

FIGS. 2, 3 and 4 show the manner in which the rotating balancing forces interact with the reciprocating press slide inertia forces at bottom dead center, midstroke, and top dead center. As can be seen from these figures, at the top and bottom dead center positions, the forces developed by the rotating balance weights are equal and opposite to the primary slide inertia force together with the rotating unbalance. At the mid-stroke position where no primary slide inertia force is developed the rotating weights produce equal and opposite horizontal force components which cancel one another out without producing any net reaction tending to move the press structure.

The overall effect is that the only balancing errors in the system are due to (a), secondary inertia forces which are quite small with the typical large ratio of connecting rod length to crank throw eccentricity in a press, and (b), the error due to the die weight on the press slide not being identically equal to the value for which the balancing system was designed. This latter error may be made as small as desired by designing the press balancing system for the heaviest expected die weight and then by adding the necessary weight to the slide in each case so that the weight of the die in use, plus the added weight, is always equal to the design value. In practice, the die weight error to be expected in a given size press will usually not be sufficient to justify the added complication of this correction procedure.

It should also be noted that a press utilizing a scotch yoke mechanism to actuate the slide in place of the connecting rod mechanism of the present design illustrated develops no secondary slide inertia force, and hence would provide a more perfect degree of balancing.

A modification of the balancing method described may distribute any one or all of the balancing weights into two or more parts located in the same or different planes along the shafts. The overall effect of subdividing the weights in this manner will be the same as if the equivalent total weight were placed at the location of the center of gravity of the subdivided weights.

From the foregoing, it will be apparent that there is not only contemplated the balancing of the crankshafts by gears at one end having an off center weight and a counterweight near the other end having an off center weight, but it is also contemplated that a plurality of counterweights could be distributed along each crankshaft in positions therealong determined in the manner indicated above.

Modifications may be made within the scope of the appended claims.

What is claimed is:

1. In a press having a crown and a slide reciprocable relative to the crown; a pair of parallel crankshafts rotatable in the crown, means for driving said crankshafts in counterrotation, each crankshaft having throw portions and connecting means connecting said throw portions to the slide for driving the slide in reciprocation as the crankshafts rotate, and means for substantially counterbalancing the inertia forces developed by the reciprocating slide and connecting means and the centrifugal forces developed on the crankshafts by eccentric mass disposed at said throw portions, said means comprising mass element means eccentrically mounted on said crankshafts, said mass element means being not all of equal magnitude or distance from the centerline of the reciprocating slide and oriented on the respective crankshafts so as to be in opposed relation when the slide is about midway in the stroke thereof and in cumulative relation when the slide is at the ends of the stroke thereof.

2. A press according to claim 1 in which said connecting means includes a pair of pistons each fixed at one end to the slide and extending in parallel relation from the slide toward the crankshafts and each piston in the plane of the axis of a respective crankshaft, said connecting means also including connecting rods each having one end engaging the throw portion of a respective crankshaft and the other end pivoted to the other end of a respective piston, said pistons being adapted for being guided for axial reciprocation in the press crown.

3. A press according to claim 1 in which the amount of mass of said mass element means and the radius of eccentricity thereof relative to the respective crankshaft is substantially determined by the formula:

$$Mm\ Rm = Rs\ (0.5\ Ms + Mr)$$

where $Mm$ = mass of mass element means pertaining to the crankshaft
$Rm$ = radius of eccentricity of the mass of the mass element means
$Rs$ = radius of eccentricity of the throw portion of the crankshaft
$Ms$ = mass of reciprocating components
$Mr$ = mass of throw portion of the crank shaft and the portion of the pertaining connecting rod that can be considered to rotate therewith.

4. A press according to the claim 3 in which said mass element means for each crankshaft comprises at least two mass elements in axially spaced relation on the respective crankshaft.

5. A press according to claim 3 in which each crankshaft has first and second mass elements mounted thereon and the amount of mass in the respective element and the radius of eccentricity thereof relative to the respective crankshaft is substantially determined by the formula:

$$Mga\ Rga + Mwa\ Rwa = Rs\ (0.5\ Ms + Mr)$$

where $Mga$ = mass of first mass element
$Rga$ = radius of eccentricity of first mass element
$Mwa$ = mass of second mass element
$Rwa$ = radius of eccentricity of second mass element
$Rs$ = radius of eccentricity of the throw portion of the crankshaft
$Ms$ = mass of reciprocating components
$Mr$ = mass of throw portion of the crankshaft and the portion of the pertaining connecting rod that can be considered to rotate therewith.

6. A press according to claim 5 in which said first and second mass elements are mounted on opposite axial sides of the throw portion of the respective crankshaft with the axial spacing $Lga$ of the said first mass element from said throw portion related to the axial spacing $Lwa$ of the said second mass element from the said throw portion according to the formula: $Mga\ Rga\ Lga = Mwa\ Rwa\ Lwa$.

7. A press according to claim 1 in which the mass element means pertaining to each crankshaft comprises a plurality of mass elements mounted thereon in axially distributed relation and on opposite axial sides of the throw portion thereof, the amount of mass in the respective mass elements and the radius of eccentricity thereof relative to the axis of the respective crankshaft and the axial location of each mass element relative to the throw portion of the crankshaft is substantially determined by the following formulae:

$$\Sigma Mr\ Rr\ Lr = \Sigma M1\ R1\ L1$$

$$\Sigma Mr\ Rr + \Sigma M1\ R1 = Rs\ (0.5\ Ms + Mr)$$

where:
$Mr$ = mass of each mass element on one side of throw portion of the crankshaft
$Rr$ = radius of eccentricity of the respective mass element
$Lr$ = axial distance of the respective mass element from the throw portion of the crankshaft
$M1$ = mass of each mass element on other side of throw portion of the crankshaft
$R1$ = radius of eccentricity of the respective mass element
$L1$ = axial distance of the respective mass element from the throw portion of the crankshaft
$Rs$ = radius of eccentricity of the throw portion of the crankshaft
$Ms$ = mass of reciprocating components
$Mr$ = mass of throw portion and that part of the connecting rod that can be considered to rotate therewith.

* * * * *